Patented Dec. 2, 1952

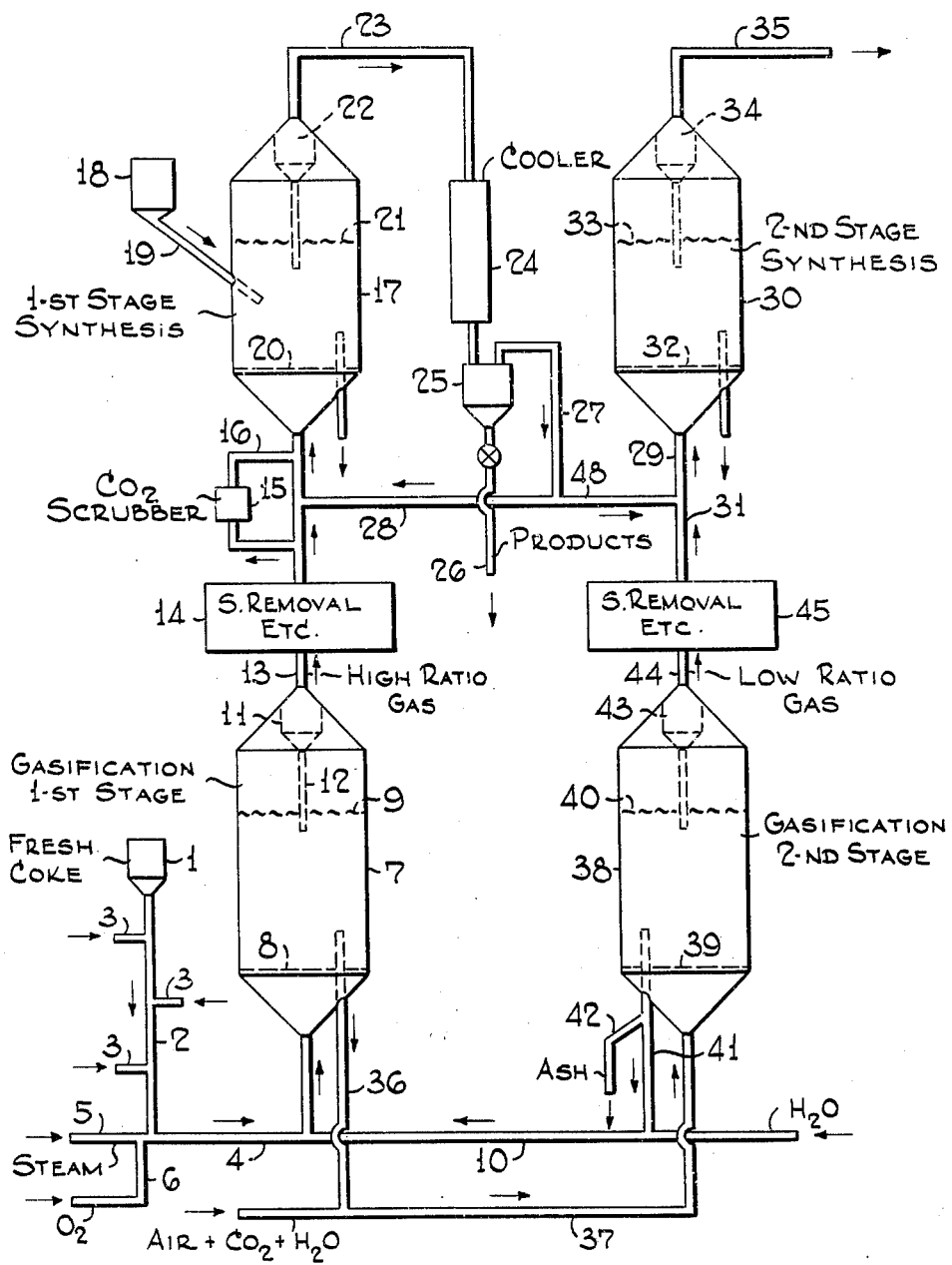

2,620,348

UNITED STATES PATENT OFFICE 2,620,348

HYDROCARBON SYNTHESIS PROCESS WITH TWO-STAGE COKE GASIFICATION

Walter G. May, Roselle, and Sumner B. Sweetser, Cranford, N. J., assignors to Standard Oil Development Company, a corporation of Delaware Application July 20, 1950, Serial No. 174,962

14 Claims. (Cl. 260—449.6)

1

The present invention relates to the catalytic reaction between carbon monoxide and hydrogen to form valuable liquid products, and more specifically, to a novel process for preparation and utilization of synthesis gas. More particularly, the present invention is concerned with improvements in the reaction based upon an improved two-stage process for preparing synthesis gas from coke or coal, and a two-stage process for reacting synthesis gas thus produced to give high yields of valuable high octane gasoline, preferably at low synthesis pressures.

The synthetic production of liquid hydrocarbons from gas mixtures containing various proportions of carbon monoxide and hydrogen is a matter of record, and numerous catalysts, usually containing an iron group metal, have been described which are specifically active in promoting the desired reactions at certain preferred operating conditions. Thus for example, cobalt supported on an inert carrier is used when relatively low pressures of about 1 to 5 atmospheres and low temperatures of about 350°–425° F. and synthesis gas ratios of about 2 mols $H_2$ per mol CO are applied in the manufacture of a substantially saturated hydrocarbon product, while at higher temperatures of 450°–750° F. and higher pressures of 15-40 atmospheres required for the production of unsaturated and branch chained products of high anti-knock value, iron type catalysts are more suitable.

In both cases the reaction is strongly exothermic and the utility of the catalyst declines steadily in the course of the reaction, chiefly due to the deposition of non-volatile conversion products such as paraffin wax, carbon, and the like, on the catalyst.

The extremely exothermic character and high temperature sensitivity of the synthesis reaction and the relatively rapid catalyst deactivation have led, in recent years, to the application of the fluid solids technique wherein the synthesis gas is contacted with a turbulent bed of finely divided catalyst fluidized by the gaseous reactants and products. This technique permits continuous catalyst replacement and greatly improves heat dissipation and temperature control.

Most processes for synthesis of hydrocarbons from synthesis gas obtained from coal or coke involve the production of relatively pure oxygen for the partial combustion of these raw materials to form CO and $H_2$ which are then reacted in a second step. In order to produce a highly unsaturated hydrocarbon product of high octane value, it is generally considered desirable to oper-

2 ate the synthesis reaction at high pressures of about 400 p. s. i. g. in the presence of an iron catalyst. This, however, involves production of relatively pure oxygen, also at high pressures. It would be uneconomic to employ air at high pressure rather than oxygen because the recycle requirements associated with an iron catalyst would result in the undesirable recirculation of a gas containing an ever-increasing amount of nitrogen.

Closely allied with the problem of making high octane gasoline from synthesis gas at low pressure is the composition of the synthesis gas in relation to the catalyst employed. The synthesis of hydrocarbons from CO and $H_2$ follows different courses in accordance with the catalyst used in the synthesis. When a cobalt catalyst is employed, the reaction proceeds substantially as follows:

(1) 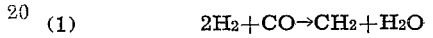
$$2H_2 + CO \rightarrow CH_2 + H_2O$$

Little or no $CO_2$ is formed, and thus it is customary to employ in a cobalt-type synthesis feed gas compositions in the same proportion as they are consumed in the reaction, i. e. 2 mols $H_2$ per mol CO. When an iron-type catalyst is employed, however, not only does the reaction occur in part as (1) above, but, as a result of the water gas shift reaction for which iron is a catalyst, reaction (2) below also occurs to a substantial extent:

(2) $\qquad CO + H_2O \rightarrow CO_2 + H_2$ making the overall reaction for the iron catalyst process as follows:

(3) 
$$3CO + 3H_2 \rightarrow 2CH_2 + CO_2 + H_2O$$

and thus in the iron-type process, the synthesis gas constituents are theoretically consumed in about equimolar ratios.

Thus, in the synthesis reaction according to Equation (1) above, the consumption ratio of $H_2$ to CO is 2/1, and this obtains generally with a cobalt catalyst. However, as indicated in the presence of an iron catalyst, some of the $H_2O$ formed reacts with some unconverted CO, the latter reaction consumes CO and forms $H_2$ which in effect lowers the $H_2/CO$ consumption ratio. The ultimate in this reaction would be for all of the $H_2O$ formed to react rapidly and irreversibly with CO in which case the net synthesis reaction could be written

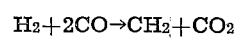
$$H_2 + 2CO \rightarrow CH_2 + CO_2$$

giving an $H_2/CO$ consumption ratio of 0.5/1. Thus the $H_2/CO$ consumption ratio can vary from about 2/1 to almost 0.5/1 depending on the degree to which the water gas shift reaction takes place. Almost invariably, in the absence of added $CO_2$, the consumption ratios with an iron catalyst are less than unity.

In the hydrocarbon synthesis process provisions are generally made to recycle the tail gas in order to utilize the carbon dioxide content resulting from the water gas shift reaction, in accordance with reaction (4) $\quad CO_2 + H_2 \rightarrow CO + H_2O$ However, as indicated heretofore, when the synthesis gas is prepared comparatively cheaply from coal by employing air at low pressures instead of by the more expensive procedures involving pure oxygen, a substantial proportion of inerts, particularly nitrogen, is present in the synthesis gas, and recycle of tail gas would be a distinctly uneconomic process, because of the large volumes of inerts involved, and thus, it is desirable to employ a once-through process, wherein recycle of tail gas may be dispensed with or at least substantially diminished.

In a once-through hydrocarbon synthesis operation at pressures of 50–150 p. s. i. g. with fluidized catalyst it is highly desirable that the overall $H_2/CO$ consumption ratio approach as nearly as possible the ratio in which these two constituents are present in the feed. However, as has been indicated above, when an iron catalyst is employed in the process, the $H_2/CO$ utilization ratio is less than the $H_2/CO$ feed ratio, and, in order to obtain a utilization or consumption ratio approaching the feed ratio it has generally been necessary to employ recycle of the product gas. By this means the concentration of $CO_2$ is built up in the recycle stream so that the water gas shift reaction is repressed and the oxygen in the feed is eliminated as water rather than as $CO_2$, thereby increasing the $H_2/CO$ consumption or utilization ratio. However, the use of recycle is objectionable, particularly at relatively low pressures where the volumes of gas handled are large, and various means have been sought whereby a once-through operation could be used in place of recycle.

It is one of the purposes of the present invention to provide a means for reducing or eliminating the need for recycle in a hydrocarbon synthesis operation.

It is a further purpose of the present invention to provide a highly economical process of producing synthesis gas from coal or coke by means of the water gas reaction in a multi-stage process and employ the same in a multi-stage synthesis operation.

It is also a purpose of the present invention to disclose a process for preparing synthesis gas of any desired composition for a two-stage hydrocarbon synthesis operation.

It is another purpose of the present invention to provide a two-stage hydrocarbon synthesis process wherein a synthesis gas derived from coal or coke may be converted into valuable hydrocarbons of high octane value at relatively low pressures in a substantially once-through operation.

Other objects of the invention will in part be obvious and will in part appear hereinafter.

In accordance with the present invention, more effective utilization of coal or coke used in the production of synthesis gas for the synthesis operation is obtained, and the need for recycle is reduced and eliminated, by employing a two-stage coke gasification unit coupled with a two-stage synthesis unit operating in a novel manner described hereinafter.

The two gasification reactors are operated to give product gas streams of different compositions. In the first, a gas of relatively high hydrogen to carbon monoxide ratio is produced, and fresh coke is charged to this reactor so that the carbon content of the coke of the bed is maintained relatively high. Steam and either air or oxygen are supplied, though the use of oxygen is preferred to that of air because of the advantages to be gained subsequently in the synthesis operation. It is preferable to maintain a fairly high carbon content in the coke of this reactor to keep the rate of conversion of steam high.

The product gas from the first stage of gasification has a hydrogen to carbon monoxide ratio in proper balance for optimum synthesis operation with an iron catalyst, that is, a hydrogen to carbon monoxide ratio from 1.0 to 1.5. This gas is then fed directly into the first stage of the synthesis plant. Since the ratio of hydrogen to carbon monoxide utilization, or the consumption ratio, in the synthesis is always less than 1 when an iron catalyst is employed, the gas from the first synthesis step, after condensation and removal of product, will have a hydrogen to carbon monoxide ratio which is out of balance for good synthesis operation, that is, the hydrogen to carbon monoxide ratio is too high and would be unsuitable for further synthesis without adjustment of the composition. It is in part to provide this adjustment that the second stage gasification is employed.

As described above, the first stage gasification is operated to give a product of relatively high hydrogen to carbon monoxide ratio, which high ratio is obtained in part by charging fresh coke relatively rich in hydrogen and in part as a result of the water gas shift reaction. The second stage gasification unit is operated to give a product gas of low hydrogen to carbon monoxide ratio. This is done by feeding it with carbon dioxide, a small amount of steam and air or oxygen sufficient to maintain a heat balance and using a coke depleted in hydrogen. The carbon dioxide supplied may be obtained from the waste gas from the synthesis operation. Conversion of $CO_2$ to carbon monoxide in this reactor is obtained largely by the water gas shift reaction rather than directly by the reaction of carbon dioxide with carbon. Since the water gas shift reaction is reasonably rapid, it is unnecessary to maintain as high a carbon content in the coke in this reactor; the coke feed to this reactor may, therefore, be obtained from the spent coke from the first reactor. Addition of an iron catalyst to this reactor to accelerate the water gas shift reaction may be used as desired, though its addition is not essential. While a large fraction of the product gas from the reactor is obtained by reduction of this carbon dioxide and a low carbon coke is used, it is nevertheless, necessary that steam conversions be maintained high in order to obtain good utilization of the carbon dioxide supplied. This may be accomplished by operating with a low ratio of steam supplied per hour per unit weight of carbon in the bed.

The product gas from the second gasification stage, which has a low hydrogen to carbon monoxide ratio of the order of 0.50 to 0.80, after treatment for sulfur removal, is then blended with the gas from the first synthesis stage so that the hydrogen to carbon monoxide ratio of the mixture passing to the second synthesis stage is in the range of 0.8 to 1.2 and consequently suitable for further synthesis operation for a once-through process and recycle may be dispensed with in the second stage entirely.

The carbon dioxide required in the feed for gasification in the second zone may be obtained by scrubbing the product gas from the second synthesis zone or scrubbing the synthesis gas produced in the first gasification zone.

Thus, in accordance with the invention, the following are among the advantages which are realized:

1. Recycle during the synthesis operation is minimized or eliminated.

2. Substantially complete utilization of the coal or coke feed is obtained by utilizing the products of combustion in the synthesis operation.

3. The nitrogen and the combustion gas from the second gasification zone act as a diluent only in the second stage of the synthesis operation. Where it is desirable or necessary to eliminate the nitrogen diluent entirely, oxygen rather than air may be used in the feed for the second gasification stage.

One of the novel features of the process shown here is the use of carbon dioxide in conjunction with a low carbon content coke in the second gasification stage to yield a low hydrogen:carbon monoxide ratio gas. This method of operation is possible due to the rate of the reverse water gas shift reaction

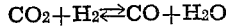

Reduction of carbon dioxide to carbon monoxide is much more rapid by operating through this reaction than by direct reduction of carbon dioxide with carbon; thus, considerable reduction of carbon dioxide is obtained despite the low carbon content of the coke. Another novel feature is the combination of the two gas streams of different composition to yield synthesis gas of optimum hydrogen to carbon monoxide ratio for use in the second synthesis stage.

The operations described in this invention may be performed at either atmospheric or at high pressures but it will be advantageous ordinarily to operate the particular combinations shown at intermediate pressures of about 50 to 250 p. s. i. In general, it will be preferable to operate the reaction vessel by the fluid technique.

The invention will best be understood by referring to the accompanying diagrammatic representation of a modification of the present invention wherein is represented suitable equipment and flow of material for carrying out a preferred embodiment of the invention.

Referring now to the figure, fresh coke or coal ground to a finely divided form, preferably capable of passing through a 60 mesh screen and even through a 100 mesh screen, though particles of larger size may under certain circumstances be employed, is fed from supply hopper 1 into standpipe 2 which is provided with a plurality of taps 3, through which slow currents of an aeration gas such as superheated steam or oxygen, etc., may be injected in order to suspend the coke or coal. The finely divided carbonaceous solids are introduced into line 4 wherein they are further dispersed and suspended in a stream of superheated steam introduced through line 5 and, if desired, oxygen introduced through line 6. The suspension of fresh coke or coal, steam and oxygen is discharged into the bottom of water gas generator 7, the suspension entering below a distribution means 8, and then passing upwardly. Due to the superficial velocity of said steam which is generally maintained within the limits of from about .2 to 3.0 feet per second, but may be even higher, the coke or coal is formed into a dense turbulent ebullient mass having a well defined upper level 9. As detailed below, in one modification of the invention, hot spent solids from the second gasification stage may be admitted through line 10, though this is not always necessary. The steam and carbonaceous material react to form water gas, a gasiform product containing CO and $H_2$. The gas generator is maintained at a temperature of from about 1600° to 2100° F., preferably about 1700° to 1900° F., and a pressure of from about 50 to 250 p. s. i. g., although pressures up to 400 pounds and even higher, may be employed, under certain conditions, dependent upon the pressures employed in the subsequent hydrocarbon synthesis reactor. The heat requirements for the reaction are furnished substantially by combustion of part of the carbonaceous solids in reactor 7 by the oxygen admitted through line 6, the total supply of oxygen being carefully controlled to generate sufficient heat by combustion to satisfy the heat requirements of the process.

As detailed further below, all or part of the oxygen may be replaced by hot coke withdrawn from the subsequent gasification stage which is suspended in steam and is charged to gasification reactor 7 through line 10. Within gasification reactor 7, besides production of carbon monoxide and hydrogen, some water gas shift reaction takes place with the formation of carbon dioxide and as a result of this reaction wherein water reacts with carbon monoxide to produce carbon dioxide and hydrogen, the ratio of hydrogen to carbon monoxide is increased above 1, i. e. theoretically 1 mol of carbon reacts with 1 mol of water to form 1 mol of hydrogen and 1 mol of carbon monoxide and at least some of the carbon monoxide reacts with further water to produce more hydrogen. In addition, hydrogen is also produced from the volatile matter in the fresh coke. Also, oxides of carbon are produced from combustion of carbon with oxygen. The net effect of these reactions is to produce a gas which may have a hydrogen to carbon monoxide ratio from about 1.2 to 1.5.

The relative amounts of reactants, hold-up time in the reactor and contact time of coke and steam supplied to generator 7 are so controlled that an overall conversion of about 50 to 85% of the steam is obtained, and that the concentration of carbon on the total solids in the reactor is maintained in the range of from about 55 to 80%.

A gas consisting mainly of carbon monoxide and hydrogen with an $H_2$ to CO ratio of about 1.2–1.5 to 1, with some admixture of $CO_2$, is drawn overhead from generator 7 through dust separator 11, such as a cyclone which has a dip pipe 12 extended below the dense phase level 9 of the fluidized bed for returning separated dust particles. The water gas is withdrawn overhead through line 13 and treated for sulfur removal in sulfur removal zone 14. Any conventional means for removing sulfur known in the art may be employed. The sulfur-free gas may, if desired, be passed through $CO_2$ scrubber 15 for removal of carbon dioxide and the resulting synthesis gas, free of sulfur contaminants and, if desired, at least partially freed of its $CO_2$ content is then passed to first stage hydrocarbon synthesis reactor 17, through line 16. Reactor 17 may contain any desired iron type hydrocarbon synthesis catalyst such as an "ammonia synthesis" catalyst, an iron oxide catalyst impregnated with potassium carbonate, or other alkali metal salt promoter, promoted pyrites ash, mill scale, etc. The catalyst is in the form of a powder having a particle size range up to about 200 microns with a major portion thereof, say 55 to 65%, having a particle size of 40 to 80 microns. The catalyst may be introduced to reactor 17 from hopper 18 through line 19.

The high hydrogen to CO ratio synthesis gas introduced through feed line 16 into the bottom of reactor 17 passes through a distributing means 20 and then into the body of reactor 17 and flows upwardly at a superficial velocity of from about ½ to 3 feet per second whereupon a dense turbulent ebullient suspension of catalyst in a vaporiform material is formed. By superficial velocity is meant a velocity measured under the conditions prevailing in the reactor but assuming no catalyst therein. Depending upon the superficial velocity within the reactor and the amount of catalyst therein, the dense suspension of catalyst has an upper dense phase level 21.

The reaction conditions within first stage synthesis reactor 17 are those normal for iron type synthesis catalyst and include temperatures of from about 450° to 700° F., preferably in the range of about 550° to 650 F., while pressure may be in the range of from 50 to 400 p. s. i. g., preferably in the range of 50 to 250 p. s. i. g. It is understood that though the process of the present invention may be operated at conventional hydrocarbon synthesis pressures, it is particularly adapted to operations at lower pressures of 50 to 150 p. s. i. g.

The reactant gases are withdrawn overhead from reactor 17 through cyclone 22 and line 23, cooled in cooling zone 24 and then to a separator 25, for the removal of easily condensible gaseous products. Thus, the major portion of the gas of the stream from reactor 17 boiling above 135 F. may be condensed out in this zone and removed through line 26 for further processing to produce valuable motor fuels, oxygenated products, etc. The gaseous products not condensed in the cooling and condensation zones comprising principally unreacted synthesis gas and low molecular weight hydrocarbons as well as $CO_2$, etc, are removed overhead from separator 25 through line 27. A minor portion of this gas may be recycled to reactor 17, if desired, through line 28 in order to maintain some control over the hydrogen to CO consumption ratio, i. e. to return some carbon dioxide which reacts with excess hydrogen to form further quantities of carbon monoxide. However, in accordance with this invention, the recycle ratio of fresh feed to recycle is relatively small and in some cases, recycle may be advantageously dispensed with entirely.

Though the product gas from the first stage gasification reactor 7 has a hydrogen to CO ratio in proper balance for optimum synthesis operation with an iron catalyst, the tail gas withdrawn from synthesis reactor 17 has a hydrogen to carbon monoxide ratio far too high for effective utilization in a second synthesis stage. In order to adjust the synthesis gas composition to the second stage, the major portion of the tail gas is withdrawn from separator 25 through line 27 and is admixed with a low ratio $H_2$ to CO gas from a second gasification stage and passed to a second synthesis stage through line 48 in a manner described more fully below.

The main uncondensed gas stream from separator 25 is passed via lines 27 and 48 and introduced into secondary synthesis zone 30 through line 29. Also added to 30 through lines 29 and 31, is low ratio $H_2$ to CO gas prepared in the manner described subsequently. The amounts of the high $H_2$ to CO tail gas from reactor 17 and of the low $H_2$ to CO gas from the second gasification stage are adjusted so that the $H_2$ to CO ratio of the gas entering reactor 30 is in the range of 0.8 to 1.2.

Within 30, the catalyst is also in the form of a powder in dense suspension in a gasiform material fed to this reactor through line 29. The entering gasiform material passing first through a distributor 32 and then passing upwardly through the reactor at about the same superficial velocity as employed in reactor 17. Reaction conditions obtaining within reactor 30 are of the same order of magnitude as those obtaining in the first stage reactor, i. e. temperatures in the range of 550 to 650° F., pressures in the range of 50 to 150 p. s. i. g. and the catalyst is also preferably any iron type hydrocarbon synthesis catalyst. The reactor 30, as reactor 17, has a catalyst disengaging space between the upper dense phase level 33 and the top of the reactor for facilitating the separation of catalyst from gasiform material before the latter is withdrawn from the reactor. A cyclone 34 may be disposed in the upper portion of reactor 30 through which gasiform material about to be withdrawn from the reactor is forced to effect substantial separation of entrained catalyst from the gases and/or vapors issuing from the reactor.

After a sufficient time of contact, the reactant gases are removed overhead from secondary reactor 30 through line 35. This effluent is passed to a cooling and separation zone for further processing all in a manner known per se and $CO_2$ may be removed by any conventional process.

Returning now to primary gasification reactor 7, hot carbonaceous solids, now coke of relatively higher ash content than that admitted through line 2, are continuously withdrawn through aerated bottom draw-off line 36, which extends above distributor 8. The hot carbonaceous material is introduced into line 37 wherein it is dispersed and suspended in a gaseous stream comprising air, carbon dioxide and a relatively small amount of superheated steam and is carried in suspension in the gas into secondary gasification vessel 38. Zone 38 may be approximately of the same order of magnitude as zone 7 and contains a distributor 39 through which the gases and solids are dispersed and the coke is kept in a dense turbulent suspension with an upper dense phase level 40. Within reactor 38, heat is released by the combustion of carbon with the oxygen supplied through line 37 in the form of air.

The gas feed to reactor 38 generally contains oxygen, either relatively free of nitrogen or as air, amounting to 30% to 45% of the volume of the steam. The carbon dioxide content of the gas fed to reactor 38 generally lies in the range of 20% to 60% of the volume of the steam fed, low carbon dioxide content being associated in general with a low oxygen content, and high carbon dioxide content with a high oxygen content. Larger carbon dioxide and oxygen contents may be used if very low hydrogen/carbon monoxide ratio gas is required.

The relatively small amount of steam in the feed reacts to form hydrogen and carbon monoxide and the carbon dioxide in the feed reacts with the hydrogen produced, by the water gas shift reaction, to produce carbon monoxide and more steam. Also, the carbon dioxide in the feed reacts to some extent with the carbon of the spent coke to produce more quantities of carbon monoxide. The net result of these reactions is that a product gas of relatively low hydrogen to carbon monoxide ratio is produced. The carbon dioxide supplied through line 37 may be obtained from the tail gas of the synthesis operation and conversion of this $CO_2$ to carbon monoxide in this reactor is obtained largely by the water gas shift reaction rather than directly by the reaction of carbon dioxide with carbon. Since the water gas shift reaction is rapid, it is unnecessary to maintain a high carbon content in the coke in this reactor and for this reason the coke fed from primary gasification reactor 7 contains an adequate supply of carbon. If desired, an iron catalyst may be added to gasification reactor 38 in order to accelerate the water gas shift reaction but the addition of this catalyst is not essential as the water gas shift reaction at the reaction conditions obtaining in zone 38, which conditions include pressures of from 50 p. s. i. g. to 150 p. s. i. g. and temperatures of 1600° to 2100° F., are adequate for promoting the water gas shift. While a large fraction of the product gas from reactor 38 is obtained by reduction of the carbon dioxide to carbon monoxide and a low carbon coke is used, it is nevertheless, necessary that steam conversions be maintained reasonably high in order to obtain good utilization of the $CO_2$ supplied. This is accomplished by operating with a relatively low ratio of steam supply per hour per unit weight of carbon in the bed. Thus, a desirable ratio of steam per hour per unit weight of carbon in zone 38 is in the range of 0.1 to 0.4 mol steam/hour $\times$ mol carbon. The overall reaction in zone 38 is generally exothermic so that coke is heated to a temperature in the range of about 1800° to 2000° F. and coke, may, if desired, be continuously withdrawn from reactor 38 through standpipe 41 for recycle to primary gasification reactor 7 in order to supply some or all of the heat required in that zone.

It is to be understood, however, that recycle of hot coke from the second to the first gasification stage is but one alternative method for supplying heat to the first stage. When the coke recycle process is employed, it is generally desirable to operate the second stage about 150°–200° F. higher than the first gasification stage. However, in a preferred embodiment of the invention, coke from the second stage is not recycled to the first stage, and heat is furnished to the latter by combustion of coke therein with an oxygen-containing gas.

The hot spent coke withdrawn from 41 is passed to line 10, dispersed in a stream of superheated steam and passed via lines 10 and 4 to primary gasification reactor 7. To prevent too large a build-up of spent coke in the system, a small amount of coke is continuously withdrawn from reactor 38 through line 42 and discarded from the system.

A gaseous stream comprising a low ratio hydrogen to carbon monoxide gas, which ratio is in the range of about .5 to .8, is withdrawn from above the upper dense bed level 40, passed through cyclone 43 and withdrawn from the reaction zone through line 44. The gas, in addition to containing hydrogen and carbon monoxide, may also contain carbon dioxide and sulfur and sulfur compounds and inert gases such as nitrogen. The gas stream is passed through a sulfur removal unit 45 and the sulfur-free gas is withdrawn from unit 45, and mixed and proportionated with the tail gas from the first stage synthesis reactor in proportions to be suitable for a once-through operation in second stage synthesis reactor 30. Thus, as has been previously disclosed, the $H_2$ to CO consumption ratio in the first stage is less than the ratio of these gases in the feed and is of the order of about .8 and the effluent gas from the first stage has a high hydrogen to carbon monoxide ratio, undesirable for further synthesis without adjustment of the composition. Consequently, synthesis gas from the second gasification stage having a very low $H_2$ to CO ratio is blended with a gas from the first stage of the synthesis so that the hydrogen to carbon monoxide ratio of the mixture passing into the second stage synthesis reactor is in the range of about 0.8 to 1.2 and consequently is suitable for further synthesis operation.

As a specific example of one method of operation, the following figures are cited.

The following example illustrates the modification of the invention utilizing oxygen to furnish the necessary heat for the gasification reaction. The carbonaceous feed for the gasification reaction is a low temperature coke having the following composition:

| | Per cent |
|---|---|
| Carbon | 74.08 |
| Hydrogen | 3.76 |
| Oxygen | 7.81 |
| Nitrogen | 1.53 |
| Sulfur | 2.00 |
| Ash | 10.8 |

Coke is fed through a hopper at the rate of 3200 lbs./hr. It is picked up in a stream of steam fed at a rate of 32,000 cu. ft./hr. and passed into the first stage gasification reactor. Oxygen in 95% purity is added to the first stage gasification reactor at the rate of 11,400 cu. ft./hr. in order to maintain a gasification temperature of 1700° F. The pressure is maintained at 130–135 p. s. i. g. in all parts of the system. The holdup of coke in the reactor is 10,750 lbs. Approximately 70% of the steam fed is converted to hydrogen and oxides of carbon. This synthesis gas in the first stage, after treatment for removal of sulfur compounds and carbon dioxide, has a volume on a dry basis of 74,900 cu. ft. and the following composition:

| | Per cent |
|---|---|
| Hydrogen | 56.4 |
| Carbon monoxide | 41.9 |
| Nitrogen | 1.7 |

This gas is conducted into the first synthesis stage where it is contacted with a synthesis catalyst, for example, pyrites ash impregnated with 1% of potassium carbonate. A temperature of about 625° F. is maintained in this first synthesis stage and the time of contact is regulated to give about 70% conversion of the carbon monoxide fed. The product gas is treated for the recovery of $C_2$ and higher hydrocarbons. The following approximate yields are obtained:

| | |
|---|---|
| $C_2$ | 49.6 lbs. |
| $C_3$ | 74.7 lbs. or 17.2 gals. |
| $C_{4+}$ | 292 lbs. or 48.2 gals. |

The yield of $C_{4+}$ is equivalent to 163 cc./cu. meter of CO and hydrogen converted. There is also produced 1330 cu. ft. of methane which remains in the exit gas. The volume of the exit gas produced is 45,500 cu. ft. with the following composition:

| | Per cent |
|---|---|
| Hydrogen | 54.4 |
| Carbon monoxide | 20.6 |
| Carbon dioxide | 19.3 |
| Methane | 2.9 |
| Nitrogen | 2.8 |

The gas fed to the first synthesis stage has a hydrogen-carbon monoxide ratio of 1.35 but because of the low utilization ratio the exit gas has a hydrogen-CO ratio of 2.63 which is unsuitable for further synthesis without adjustment of its composition.

Returning now to the first stage generator, coke is withdrawn therefrom at a rate of 1470 lbs./hr. The composition of the coke withdrawn which is also the composition of the coke being gasified in the generator is as follows:

| | Per cent |
|---|---|
| Carbon | 74.5 |
| Hydrogen | 0.5 |
| Ash | 23.5 |

Coke is picked up by a stream of steam flowing at the rate of 22,100 cu. ft./hr. and passed into the second stage generator. There is also added to the second stage generator 8,780 cu. ft. of oxygen in 95% purity and 13,300 cu. ft. of carbon dioxide. The holdup of coke in the second stage generator is 33,800 lbs. The temperature is maintained at 1700° and the steam conversion obtained is again about 70%. The gas produced in the second stage generator is treated for removal of sulfur and carbon dioxide. The volume of gas produced is 62,200 cu. ft./hr. and prior to the removal of carbon dioxide, it has the following composition on a dry basis:

| | Per cent |
|---|---|
| Hydrogen | 27.2 |
| Carbon monoxide | 48.8 |
| Carbon dioxide | 24.0 |
| Nitrogen | 0.7 |

The gas from the second gasification stage is mixed with the product gas from the first synthesis stage which is also treated for removal of carbon dioxide to obtain a gas of the following composition:

| | Per cent |
|---|---|
| Hydrogen | 49.4 |
| Carbon monoxide | 47.0 |
| Methane | 1.6 |
| Nitrogen | 2.0 |

This gas has a hydrogen to carbon monoxide ratio of 1.05 and is suitable for further synthesis. It is contacted with a synthesis catalyst such as pyrites ash promoted with 1% potassium carbonate at a temperature of about 625° F. with a contact time sufficient to give about 70% conversion of the carbon monoxide. The product gas from the second synthesis stage is also treated for the recovery of $C_2$ and higher hydrocarbons with the following yields:

| | |
|---|---|
| $C_2$ | 62.3 lbs. |
| $C_3$ | 94.0 lbs. or 216 gals. |
| $C_{4+}$ | 367 lbs. or 60.7 gals. |

The yield of $C_{4+}$ amounts to about 165 cc./cu. meter of hydrogen plus carbon monoxide converted. The product gas from the second synthesis stage has a volume of 47,100 cu. ft./hr. with the following composition:

| | Per cent |
|---|---|
| Hydrogen | 41.3 |
| Carbon monoxide | 25.1 |
| Carbon dioxide | 23.4 |
| Methane | 6.5 |
| Nitrogen | 3.7 |

This gas may be treated for further use in synthesis or it may be utilized as fuel gas.

From the second stage gas generator ash is discharged at the rate of 464 lbs./hr. with a carbon content of 20.7%. Thus only about 4% of the carbon is discharged from the process in ungasified form. This coke can still be utilized for generation of steam.

The process of the present invention may be widely varied and modified. The process contains the novel feature of the method of operation in the use of carbon dioxide in conjunction with a low carbon content coke in the secondary gasification reactor to yield a low hydrogen to carbon monoxide ratio gas. This method of operation is possible due to the rapidity of the water gas shift reaction; reduction of carbon dioxide to carbon monoxide is much more rapid by operating through this reaction than by direct reduction of carbon dioxide with carbon. Another novel feature is the combination of two gas streams of different compositions yielding synthesis gas of optimum hydrogen to carbon monoxide ratio for employment in the second stage synthesis reactor. It is preferable not to employ air in reactor 7 to avoid inert gases in first stage synthesis reactor 17.

The foregoing disclosure and exemplary operations have served to illustrate specific applications and results of the invention. However, other modifications obvious to those skilled in the art are within its scope.

What is claimed is:

1. An improved process for the catalytic synthesis of hydrocarbons from CO and $H_2$ which comprises passing steam and carbonaceous solids to an initial gasification stage, carrying out a water gas reaction in said stage, passing water gas wherein the $H_2$ to CO ratio is at least 1.0 to an initial hydrocarbon synthesis reaction zone, maintaining a fluidized bed of iron-containing synthesis catalyst and hydrocarbon synthesis conditions in said zone, withdrawing from said zone a tail gas comprising $CO_2$ and having a higher $H_2/CO$ ratio than said feed gas to said zone, passing at least a portion of said tail gas to a second stage hydrocarbon synthesis reaction zone, passing partially spent carbonaceous solids of relatively low carbon content from said primary gasification zone to a second gasification zone, passing steam, $CO_2$, and a free oxygen containing gas to said last-named zone, maintaining water gas generation conditions in said last-named zone to give a relatively high steam conversion, converting at least a portion of said $CO_2$ to CO, withdrawing from said second gasification zone a gaseous mixture comprising $H_2$ and CO wherein the $H_2/CO$ ratio is less than unity, passing at least a portion of said gas mixture to said second hydrocarbon synthesis zone responsive to the $H_2/CO$ ratio of said tail gas from said first hydrocarbon synthesis reaction zone to produce a total gas feed to said second hydrocarbon synthesis zone adapted to produce high yields of hydrocarbons, and maintaining an iron-comprising catalyst in said zone.

2. The process of claim 1 wherein heat required for said water gas reaction in said first gasification stage is furnished by passing a free oxygen-containing gas to said stage.

3. The process of claim 2 wherein said gas is oxygen.

4. The process of claim 1 wherein at least a portion of the heat required for said water gas reaction in said first stage is furnished by recycling hot spent char from said second water gas reaction zone.

5. The process of claim 1 wherein $CO_2$ is removed from the effluent of at least one of said synthesis stages.

6. The process of claim 1 wherein at least a portion of the $CO_2$ supplied to said second stage gasification zone is obtained from the effluent of at least one of said hydrocarbon synthesis zones.

7. The process of claim 1 wherein said carbonaceous solid fed to said first gasification stage is fresh coke.

8. The process of claim 1 wherein an iron catalyst adapted to promote the water gas shift reaction is added to said second gasification zone.

9. The process of claim 1 wherein the effluent water gas from said first gasification zone has an $H_2/CO$ ratio of about 1.0–1.5/1 and the effluent water gas from said second gasification zone has an $H_2/CO$ ratio of about 0.5–0.8/1.

10. The process of claim 1 wherein a minor portion of the tail gas from the first synthesis zone is recycled to said zone.

11. The process of claim 1 wherein the steam/carbon ratio in said first gasification stage is higher than in said second gasification stage.

12. The process of claim 1 wherein $CO_2$ is removed from the effluent of at least one of said gasification zones.

13. The process of claim 1 wherein a steam-carbon ratio of 0.1 to 0.4 is maintained in said second stage.

14. The process of claim 1 wherein the ratio of $CO_2$ to steam passed to said second stage is in the range of 20 to 60 volumes $CO_2$ per 100 volumes of steam.

WALTER G. MAY.
SUMNER B. SWEETSER.

REFERENCES CITED

The following references are of record in the file of this patent:

UNITED STATES PATENTS

| Number | Name | Date |
|---|---|---|
| 2,347,682 | Gunness | May 2, 1944 |
| 2,417,164 | Huber, Jr. | Mar. 11, 1947 |
| 2,436,938 | Scharmann et al. | Mar. 2, 1948 |
| 2,451,879 | Scharmann | Oct. 19, 1948 |
| 2,460,508 | Johnson et al. | Feb. 1, 1949 |

FOREIGN PATENTS

| Number | Country | Date |
|---|---|---|
| 585,354 | Great Britain | Feb. 5, 1947 |